United States Patent
Bowditch et al.

(10) Patent No.: US 10,113,503 B2
(45) Date of Patent: Oct. 30, 2018

(54) COMBUSTION BOWL OF A PISTON FOR AN ENGINE

(71) Applicant: Caterpillar Inc., Peoria, IL (US)

(72) Inventors: Brandon Lee Bowditch, Lafayette, IN (US); Adwait Vilas Joshi, Dunlap, IL (US); David Andrew Pierpont, Dunlap, IL (US); Kalyana Chakravarthy Vutukuri, Dunlap, IL (US); Abhijitsinha Dilipsinha Pawar, West Lafayette, IN (US)

(73) Assignee: Caterpillar Inc., Deerfield, IL (US)

(*) Notice: Subject to any disclaimer, the term of this patent is extended or adjusted under 35 U.S.C. 154(b) by 46 days.

(21) Appl. No.: 15/290,564

(22) Filed: Oct. 11, 2016

(65) Prior Publication Data

US 2018/0100466 A1   Apr. 12, 2018

(51) Int. Cl.
 *F02F 3/26*   (2006.01)
 *F02F 1/24*   (2006.01)

(52) U.S. Cl.
 CPC .............. *F02F 3/26* (2013.01); *F02F 1/242* (2013.01)

(58) Field of Classification Search
 CPC ..... F02F 3/26; F02B 23/0672; F02B 23/0687; F02B 23/0693
 See application file for complete search history.

(56) References Cited

U.S. PATENT DOCUMENTS

| | | | | |
|---|---|---|---|---|
| 544,300 | A * | 8/1895 | Hanlon | B60R 1/06 248/125.7 |
| 2,172,170 | A | 9/1939 | Megroot | |
| 6,152,101 | A * | 11/2000 | Parsi | F02B 23/06 123/193.6 |
| 6,158,409 | A * | 12/2000 | Gillespie | F02B 19/04 123/193.6 |
| 7,055,491 | B2 | 6/2006 | Linderyd et al. | |
| 2005/0115537 | A1* | 6/2005 | Liu | F02B 23/0672 123/276 |

(Continued)

FOREIGN PATENT DOCUMENTS

| | | | | |
|---|---|---|---|---|
| DE | 102006008567 | A1 * | 8/2007 | F02B 23/0651 |
| DE | 202009016548 | U1 | 5/2011 | |

(Continued)

*Primary Examiner* — Erick Solis
*Assistant Examiner* — Anthony L Bacon
(74) *Attorney, Agent, or Firm* — Miller, Matthias & Hull (57) ABSTRACT

A piston for an engine may include a piston body. The piston body may include a piston crown disposed symmetrically about a central longitudinal axis of the piston. A combustion bowl may be recessed into the piston body and may be offset axially inwardly with respect to the piston crown. A central bowl apex may protrude axially from the combustion bowl and may be offset axially inwardly with respect to the piston crown. A first bowl apex may protrude axially from the combustion bowl and may be disposed radially inwardly with respect to the piston crown. A second bowl apex may protrude axially from the combustion bowl and may be disposed radially inwardly with respect to the first bowl apex and may be radially between the first bowl apex and the central bowl apex. The second bowl apex may be offset axially inwardly with respect to the central bowl apex.

19 Claims, 4 Drawing Sheets

(56) References Cited

U.S. PATENT DOCUMENTS

| | | | |
|---|---|---|---|
| 2011/0011365 A1* | 1/2011 | Levy | F02B 23/0672 123/193.6 |
| 2011/0259297 A1* | 10/2011 | Rothbauer | F02B 23/0651 123/276 |
| 2013/0068096 A1* | 3/2013 | Gabriel | B23P 15/10 92/231 |
| 2013/0087123 A1* | 4/2013 | Ki | F02D 41/0065 123/445 |
| 2014/0048036 A1* | 2/2014 | Zoeller | F02B 23/0651 123/294 |
| 2015/0020765 A1* | 1/2015 | Pierpont | F02F 3/28 123/27 R |
| 2015/0053172 A1* | 2/2015 | Long | F02B 23/0651 123/298 |
| 2015/0337757 A1* | 11/2015 | Page | F02B 23/0651 123/193.6 |
| 2016/0258382 A1* | 9/2016 | Perrone | B21K 1/185 |
| 2016/0273484 A1* | 9/2016 | Tateno | C25D 11/04 |
| 2016/0281635 A1* | 9/2016 | Weinenger | B33Y 10/00 |
| 2016/0341106 A1* | 11/2016 | Richard | F02M 45/086 |
| 2017/0058824 A1* | 3/2017 | Weiss | F02F 3/003 |

FOREIGN PATENT DOCUMENTS

| | | | | |
|---|---|---|---|---|
| DE | 102013022040 A1 | | 6/2015 | |
| EP | 1517016 A1 | * | 3/2005 | ......... F02B 23/0651 |
| FR | 2885650 A1 | * | 11/2006 | ............ F02B 23/063 |
| FR | 2904053 A1 | * | 1/2008 | ......... F02B 23/0651 |
| GB | 522313 A | | 6/1940 | |
| JP | WO 0112966 A1 | * | 2/2001 | ......... F02B 23/0651 |
| JP | 2004190573 A | | 7/2004 | |
| WO | 2014196423 A1 | | 12/2014 | |

\* cited by examiner

COMBUSTION BOWL OF A PISTON FOR AN ENGINE

TECHNICAL FIELD

The present disclosure relates generally to pistons for engines and, more particularly, relates to combustion bowls of such pistons.

BACKGROUND

Fuel combustion in internal combustion engines typically produce oxides of nitrogen ($NO_x$) and particulate matter, such as soot and ash. Such exhaust by-products, however, are generally undesirable and efforts are continuously being made to further reduce the levels of these exhaust by-products. Developing ways to minimize the levels of these exhaust by-products, however, often involves a balancing between achieving acceptable reduction levels and maintaining combustion efficiency.

Various combustion chamber designs have been attempted to reduce the generation of $NO_x$ and particulate matter without sacrificing combustion efficiency. For example, the structural shape of the combustion bowl, which is generally disposed in the combustion face of a piston and defines a portion of the combustion chamber, may be configured to produce a desired distribution of fuel and air in the combustion chamber.

Japanese Patent Application Publication JP2004190573A (the '573 publication) discloses a combustion chamber for an engine with a cavity formed in the top surface of the piston. The cavity includes recesses providing a stepped shape. The stepped shape of the combustion chamber aims to promote the mixing of fuel and air by spreading fuel to recesses of the cavity. While the object of the combustion chamber of the '573 publication is to reduce $NO_x$ generation, improvements in reducing particulate matter continue to be sought.

SUMMARY

In accordance with an aspect of the disclosure, a piston for an engine is provided. The piston may comprise a piston body including a piston crown. The piston crown may be disposed symmetrically about a central longitudinal axis of the piston. A combustion bowl may be recessed into the piston body and may be offset axially inwardly with respect to the piston crown. The combustion bowl may be disposed symmetrically about the central longitudinal axis. A central bowl apex may protrude axially from the combustion bowl. The central bowl apex may be disposed symmetrically about the central longitudinal axis and may be offset axially inwardly with respect to the piston crown. A first bowl apex may protrude axially from the combustion bowl and may be disposed symmetrically about the central longitudinal axis. The first bowl apex may be disposed radially inwardly with respect to the piston crown. A second bowl apex may protrude axially from the combustion bowl and may be disposed symmetrically about the central longitudinal axis. The second bowl apex may be disposed radially inwardly with respect to the first bowl apex and may be radially between the first bowl apex and the central bowl apex. The second bowl apex may be offset axially inwardly with respect to the central bowl apex.

In accordance with another aspect of the disclosure, an engine is provided. The engine may comprise an engine housing including a cylinder disposed therein. A cylinder head may be coupled to the engine housing. The cylinder head may include a fuel injector disposed therethrough. The fuel injector may be configured to inject fuel into the cylinder. A piston may be operatively disposed in the cylinder and may include a central longitudinal axis. A combustion bowl may be recessed into the piston and may be disposed symmetrically about the central longitudinal axis. The combustion bowl may include a central apex protruding centrally therefrom, a first bowl apex, and a second bowl apex disposed radially between the central bowl apex and the first bowl apex. The second bowl apex may be offset axially inwardly with respect to the central bowl apex.

In accordance with yet another aspect of the disclosure, a piston for an engine is provided. The piston may comprise a piston body including a piston crown. The piston crown may be disposed symmetrically about a central longitudinal axis of the piston. A combustion bowl may be recessed into the piston body and may be offset axially inwardly with respect to the piston crown. The combustion bowl may be disposed symmetrically about the central longitudinal axis. A central bowl apex may protrude axially from the combustion bowl. The central bowl apex may be disposed symmetrically about the central longitudinal axis and may be offset axially inwardly with respect to the piston crown. The central bowl apex may include a central bow apex depth. A first bowl apex may protrude axially from the combustion bowl and may be disposed symmetrically about the central longitudinal axis. The first bowl apex may include a first bowl apex radius and a first bowl apex depth greater than the central bowl apex depth. A second bowl apex may protrude axially from the combustion bowl and may be disposed symmetrically about the central longitudinal axis. The second bowl apex may include a second bowl apex radius less than the first bowl apex radius and may include a second bowl apex depth greater than the first bowl apex depth.

These and other aspects and features of the present disclosure will be more readily understood upon reading the following detailed description when taken in conjunction with the accompanying drawings. Aspects of different embodiments herein described can be combined with or substituted by one another.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
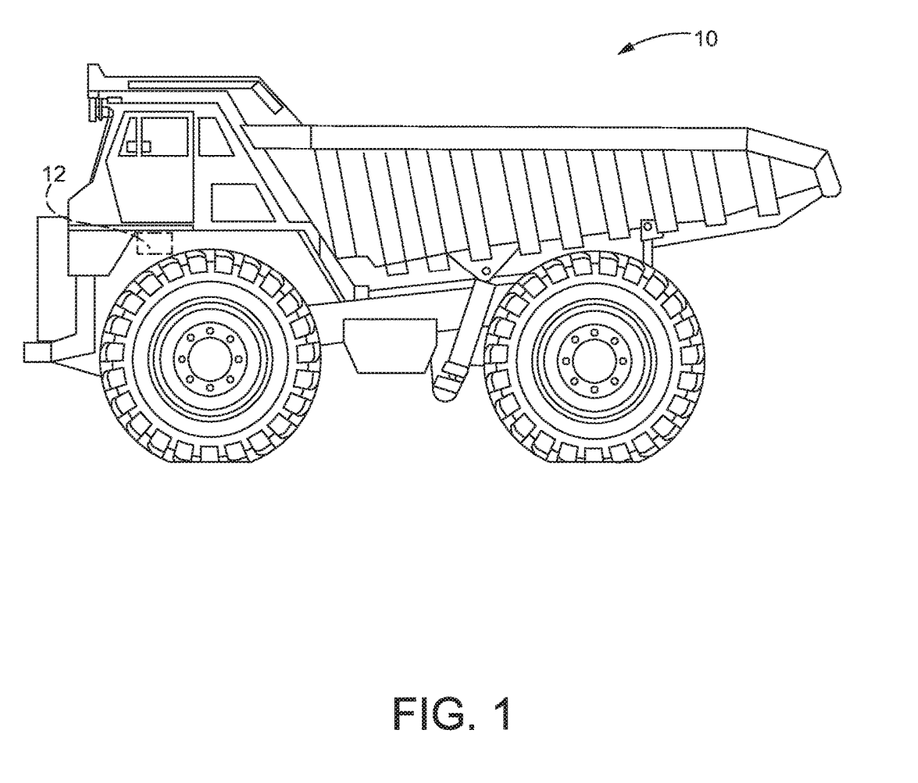
FIG. 1 is a perspective view of an exemplary vehicle, in accordance with an embodiment of the present disclosure.

Referring now to FIG. 1, an exemplary vehicle constructed in accordance with the present disclosure is generally referred to by reference numeral 10. Although exemplarily illustrated as an off-highway truck, the vehicle 10 may be any type of vehicle utilized in a wide variety of industries such as, but not limited to, mining, earth-moving, agricultural, petroleum, electric power, and construction, to name a few example. The vehicle 10 includes an engine 12. The engine 12 may be any type of internal combustion engine such as, but not limited to, diesel engines, gas turbine engines, marine engines, generator sets, and other engines well-known in the industry.

Figure 2:
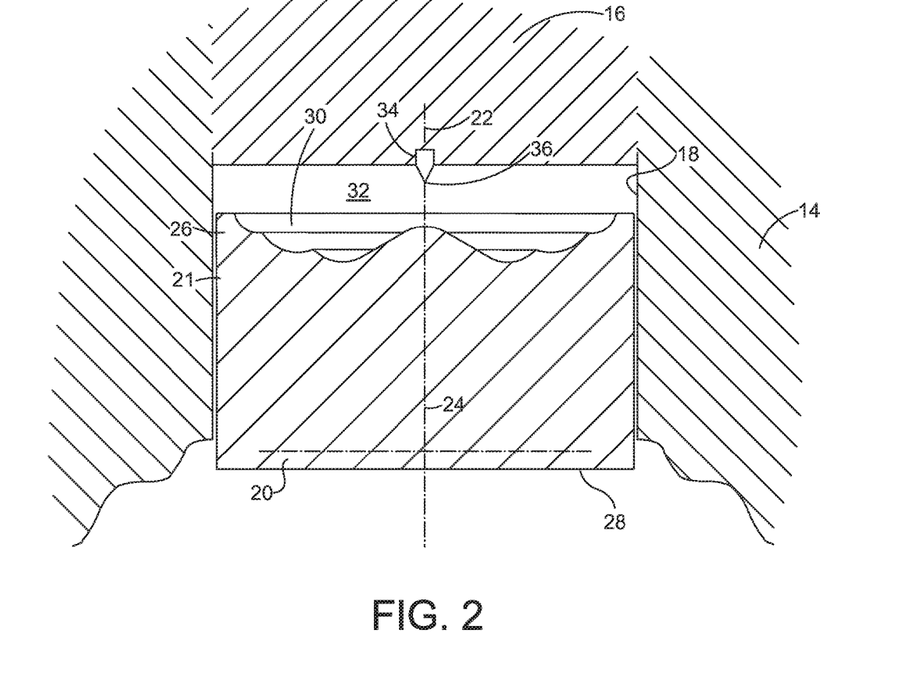
FIG. 2 is a partial cross-sectional view of an engine housing of an engine illustrating a piston operatively disposed in a cylinder, in accordance with an embodiment of the present disclosure.

With reference to FIG. 2, the engine 12 includes an engine housing 14 or engine block. A cylinder head 16 is coupled to the engine housing 14. The engine housing 14 includes a cylinder 18 disposed therein. A piston 20 is operatively disposed in the cylinder 18 to reciprocate therein. The cylinder 18 may include a central longitudinal cylinder axis 22 aligned with a central longitudinal piston axis 24 of the piston 20.

The piston 20 includes a piston body 21 extending between a first axial region 26 and a second axial region 28 of the piston 20. The first axial region 26 of the piston 20 includes a combustion bowl 30 recessed into the piston body 21. The first axial region 26 and the combustion bowl 30 of the piston 20 is arranged within the cylinder 18 facing the cylinder head 16. Further, the engine 12 includes a combustion chamber 32, which may be defined collectively by a portion of the cylinder 18, the cylinder head 16, and the combustion bowl 30. The engine 12 also includes a fuel injector 34 disposed through the cylinder head 16 such that a plurality of nozzles 36 of the fuel injector 34 is arranged in the combustion chamber 32. The fuel injector 34 is configured to inject fuel into the combustion chamber 32 toward the combustion bowl 30 via the plurality of nozzles 36. In some embodiments, the fuel injector 34 is disposed symmetrically about the central longitudinal cylinder axis 22.

Figure 3:
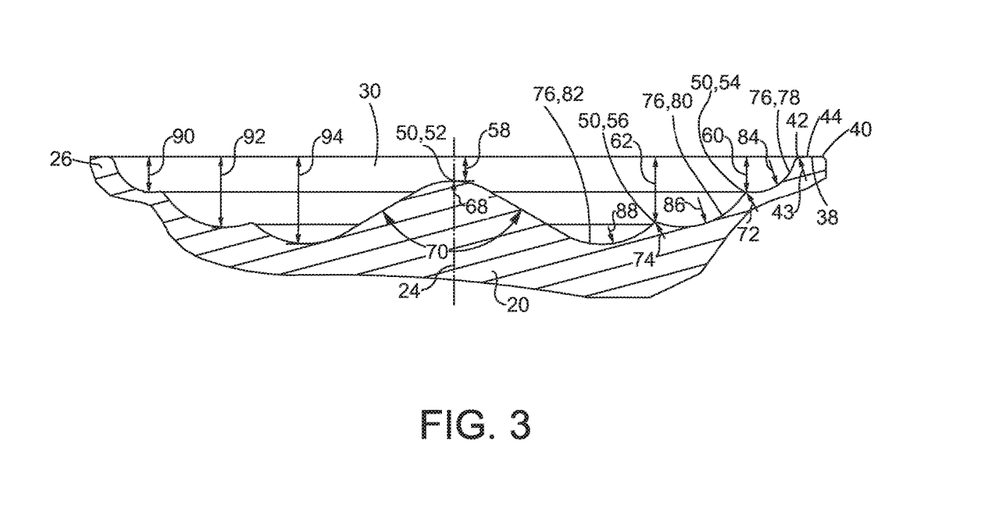
FIG. 3 is a cross-sectional view of a combustion bowl of a piston, in accordance with an embodiment of the present disclosure.
Figure 4:
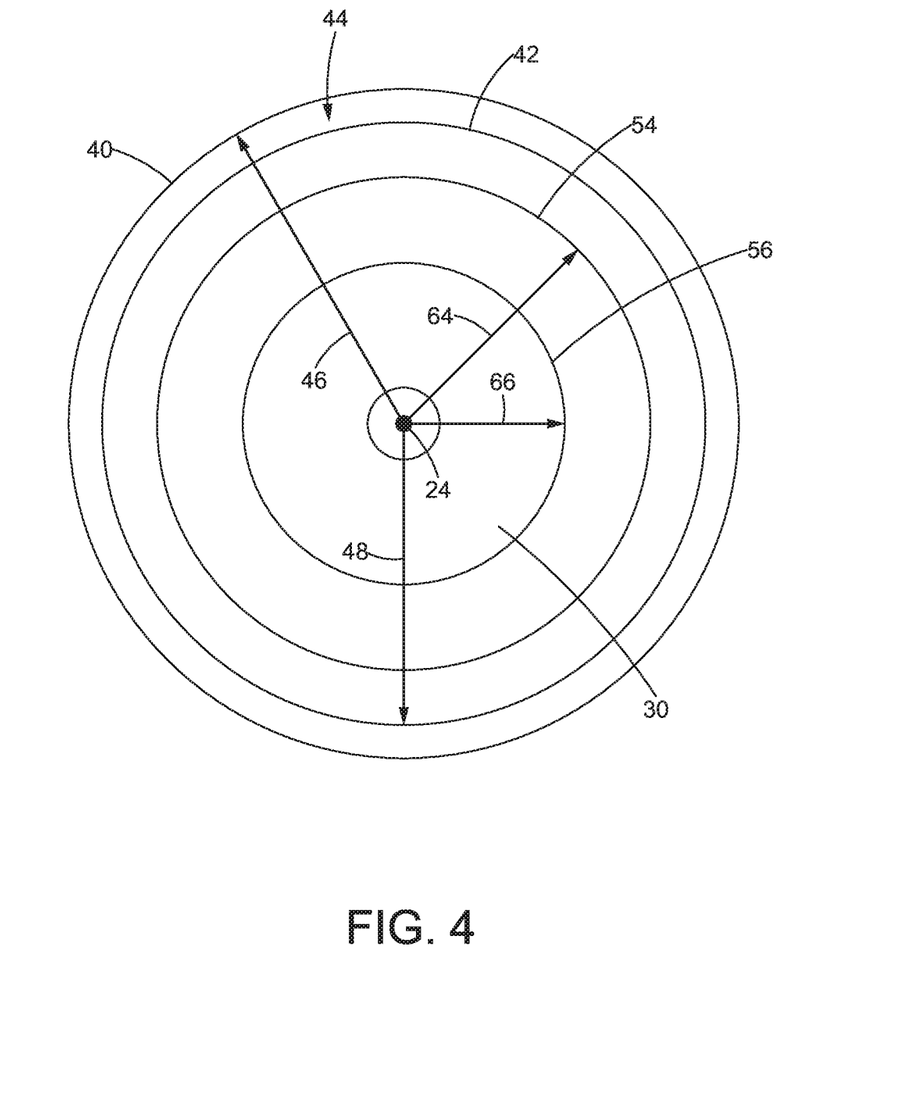
FIG. 4 is top plan view of a piston illustrating a combustion bowl thereof, in accordance with an embodiment of the present disclosure.

With reference to FIGS. 3 and 4, the combustion bowl 30 of the piston 20 is disposed symmetrically about the central longitudinal piston axis 24. The piston body 21 of the piston 20 includes a piston crown 38 also disposed symmetrically about the central longitudinal piston axis 24. The piston crown 38 includes an outer edge 40, an inner lip 42, and a face 44 disposed between the outer edge 40 and the inner lip 42. As illustrated in FIG. 4, the outer edge 40 includes an outer radius 46 measured from the central longitudinal piston axis 24 and the inner lip 42 includes an inner radius 48 measured from the central longitudinal piston axis 24. The inner lip 42 is disposed radially inwardly of the outer edge 40 such that the inner radius 48 of the inner lip 42 is less than the outer radius 46 of the outer edge 40. In some embodiments, the inner lip 42 is convex and includes an inner lip radius of curvature 43. In some embodiments, the inner lip radius of curvature 43 is in the range of approximately 0 mm to 4 mm. In other embodiments, the inner lip radius of curvature 43 is 2.291 mm. In some embodiments, the outer radius 46 is approximately in the range of 84 mm to 85 mm and the inner radius 48 is approximately in the range of 76 mm to 79 mm. In some other embodiments, the outer radius 46 is 84.072 mm and the inner radius 48 is 76.538 mm.

As illustrated in FIG. 3, the combustion bowl 30 includes a plurality of apexes 50. In some embodiments, the plurality of apexes 50 includes a central bowl apex 52, a first bowl apex 54, and a second bowl apex 56. As the combustion bowl 30 is recessed axially inwardly from the piston crown 38 into the piston body 21 of the piston 20, each apex of the plurality of apexes 50 is arranged axially inwardly from, and axially facing in the direction of, the piston crown 38. As such, with the plurality of apexes 50 arranged below the piston crown 38, the central bowl apex 52 includes a central bowl apex depth 58 as measured axially with respect to the axial position of the face 44 of the piston crown 38. In some embodiments, the central bowl apex depth 58 is in the range of 4 mm to 6 mm. In some other embodiments, the central bowl apex depth is 5.5 mm.

Similarly, the first bowl apex 54 includes a first bowl apex depth 60 as measured axially with respect to the axial position of the face 44 of the piston crown 38 and the second bowl apex 56 includes a second bowl apex depth 62 as measured axially with respect to the axial position of the face 44 of the piston crown 38. In some embodiments, the first bowl apex depth 60 is in the approximate range of 8 mm to 9 mm. In other embodiments, the first bowl apex depth 60 is 8.7 mm. In some embodiments, the second bowl apex depth 62 is in the approximate range of 15 mm to 19 mm. In other embodiments, the second bowl apex depth 62 is 18.766 mm. Moreover, as illustrated in FIG. 4, the first bowl apex 54 is disposed symmetrically about the central longitudinal piston axis 24 and includes a first bowl apex radius 64 measured from the central longitudinal piston axis 24. In some embodiments, the first bowl apex radius 64 is in the approximate range of 63 mm to 67 mm. In other embodiments, the first bowl apex radius 64 is 63.156 mm. The second bowl apex 56 is also disposed symmetrically about the central longitudinal piston axis 24 and includes a second bowl apex radius 66 measured from the central longitudinal piston axis 24. In some embodiments, the second bowl apex radius 66 is in the approximate range of 40 mm to 46 mm. In other embodiments, the second bowl apex radius 66 is 40.461 mm.

With reference back to FIG. 3, the central bowl apex 52 is substantially conical in shape and protrudes from the combustion bowl 30 outwardly in an axial direction toward the piston crown 38. The central bowl apex 52 also includes a central bowl apex radius of curvature 68. In some embodiments, the central apex radius of curvature 68 is in the range of approximately 0 mm to 20 mm. In other embodiments, the central apex radius of curvature 68 is 16 mm. The central bowl apex 52 includes a central apex angle 70. In some embodiments, the central apex angle 70 is in the range of approximately 100° to 140°. In other embodiments, the central apex angle 70 is 120°.

Still referring to FIG. 3, the first bowl apex 54 is substantially convex and also protrudes from the combustion bowl 30 in an axial direction toward the piston crown 38. The first bowl apex 54 includes a first bowl apex radius of curvature 72. In some embodiments, the first bowl apex radius of curvature 72 is in the range of approximately 0 mm to 4 mm. In other embodiments, the first bowl apex radius of curvature 72 is 1.3 mm. The second bowl apex 56 is substantially convex and also protrudes from the combustion bowl 30 in an axial direction toward the piston crown 38. The second bowl apex 56 includes a second bowl apex radius of curvature 74. In some embodiments, the second bowl apex radius of curvature 74 is in the range of approximately 0 mm to 4 mm. In other embodiments, the second bowl apex radius of curvature 74 is 1.3 mm.

Moreover, the combustion bowl 30 includes a plurality of depressions 76. In some embodiments, the plurality of depressions 76 includes a first depression 78, a second depression 80, and a third depression 82. The first depression 78 is substantially concave and includes a first depression radius of curvature 84. In some embodiments, the first depression radius of curvature 84 is in the range of approximately 9 mm to 11 mm. In other embodiments, the first depression radius of curvature is 10.163 mm. The first depression 78 is recessed into the piston body 21 of the piston 20 and transitions from the inner lip 42 to the first bowl apex 54. The second depression 80 is also substantially concave and includes a second depression radius of curvature 86. In some embodiments, the second depression radius of curvature 86 is in the range of approximately 15 mm to 17 mm. In other embodiments, the second depression radius of curvature 86 is 16 mm. The second depression 80 is recessed into the piston body 21 of the piston 20 and transitions from the first bowl apex 54 to the second bowl apex 56. The third depression 82 is also substantially concave and includes a third depression radius of curvature 88. In some embodiments, the third depression radius of curvature 88 is in the range of approximately 15 mm to 17 mm. In other embodiments, the third depression radius of curvature 88 is 16 mm. The third depression 82 is recessed into the piston body 21 of the piston 20 and transitions from the second bowl apex 56 to the central bowl apex 52.

The first depression 78 includes a first depression depth 90 as measured axially with respect to the axial position of the face 44 of the piston crown 38. In some embodiments, the first depression depth 90 is in the range of approximately 8 mm to 9 mm. In other embodiments, the first depression depth 90 is 8.821 mm. The second depression 80 includes a second depression depth 92 as measured axially with respect to the axial position of the face 44 of the piston crown 38. In some embodiments, the second depression depth 92 is in the range of approximately 16 mm to 20 mm. In other embodiments, the second depression depth 92 is 16.021 mm. The third depression 82 includes a third depression depth 94 as measured axially with respect to the axial position of the face 44 of the piston crown 38. In some embodiments, the third depression depth 94 is in the range of approximately 19 mm to 21 mm. In other embodiments, the third depression depth 94 is 20.674 mm.

In some embodiments, as exemplarily illustrated in FIGS. 3 and 4, the first bowl apex radius 64 is less than the inner radius 48 and the second bowl apex radius 66 is less than the first bowl apex radius 64 such that the first bowl apex 54 is offset radially inwardly with respect to the inner lip 42 of the piston crown 38 toward the central bowl apex 52 (e.g. the inner lip 42 is offset radially outwardly with respect to the first bowl apex 54) and the second bowl apex 56 is offset radially inwardly with respect to the first bowl apex 54 toward the central bowl apex 52, such that the second bowl apex 56 is disposed radially between the first bowl apex 54 and the central bowl apex 52. In such embodiments, the first bowl apex depth 60 is greater than the central bowl apex depth 58 and the second bowl apex depth 62 is greater than the first bowl apex depth 60 (and greater than the central bowl apex depth 58) such that the first bowl apex 54 is offset axially inwardly with respect to the central bowl apex 52 away from the axial position of the inner lip 42 of the piston crown 38 and the second bowl apex 56 is offset axially inwardly with respect to the first bowl apex 54 away from the axial position of the inner lip 42 of the piston crown 38. Moreover, in such embodiments, the first depression depth 90 is less than the second depression depth 92, which is less than the third depression depth 94, such that the second depression 80 is offset axially inwardly with respect to the first depression 78 and the third depression 82 is offset axially inwardly with respect to the second depression 80.

INDUSTRIAL APPLICABILITY

In general, the present disclosure may find applicability with pistons utilized in engines for any number of industrial settings such as, but not limited to, marine propulsion, earth-moving, construction, and agricultural settings. As a non-limiting example, the engine 12 may be a diesel engine. By utilizing the systems and methods disclosed herein, the combustion bowl 30 of the piston 20 provides a combustion chamber 32 which may reduce particulate matter and soot when the engine 12 is operating at partial load, as well as when the engine 12 is operating at full load. Moreover, the combustion bowl 30 of the present disclosure may also optimize low smoke emissions and reduce the temperature of the cylinder head 16.

For example, during operation of the engine 12, the plurality of apexes 50 of the combustion bowl 30 may create an increase in turbulence of the air that is compressed into the combustion chamber 32 towards the end of the compression stroke of the piston 20. As a result of the increased turbulence of air, more efficient combustion of the fuel that is injected into the combustion chamber 32 via the plurality of nozzles 36 of the fuel injector 34 may occur such that less particulate matter and soot is generated, particularly during partial load operation of the engine 12, as compared to other designs.

Figure 5:
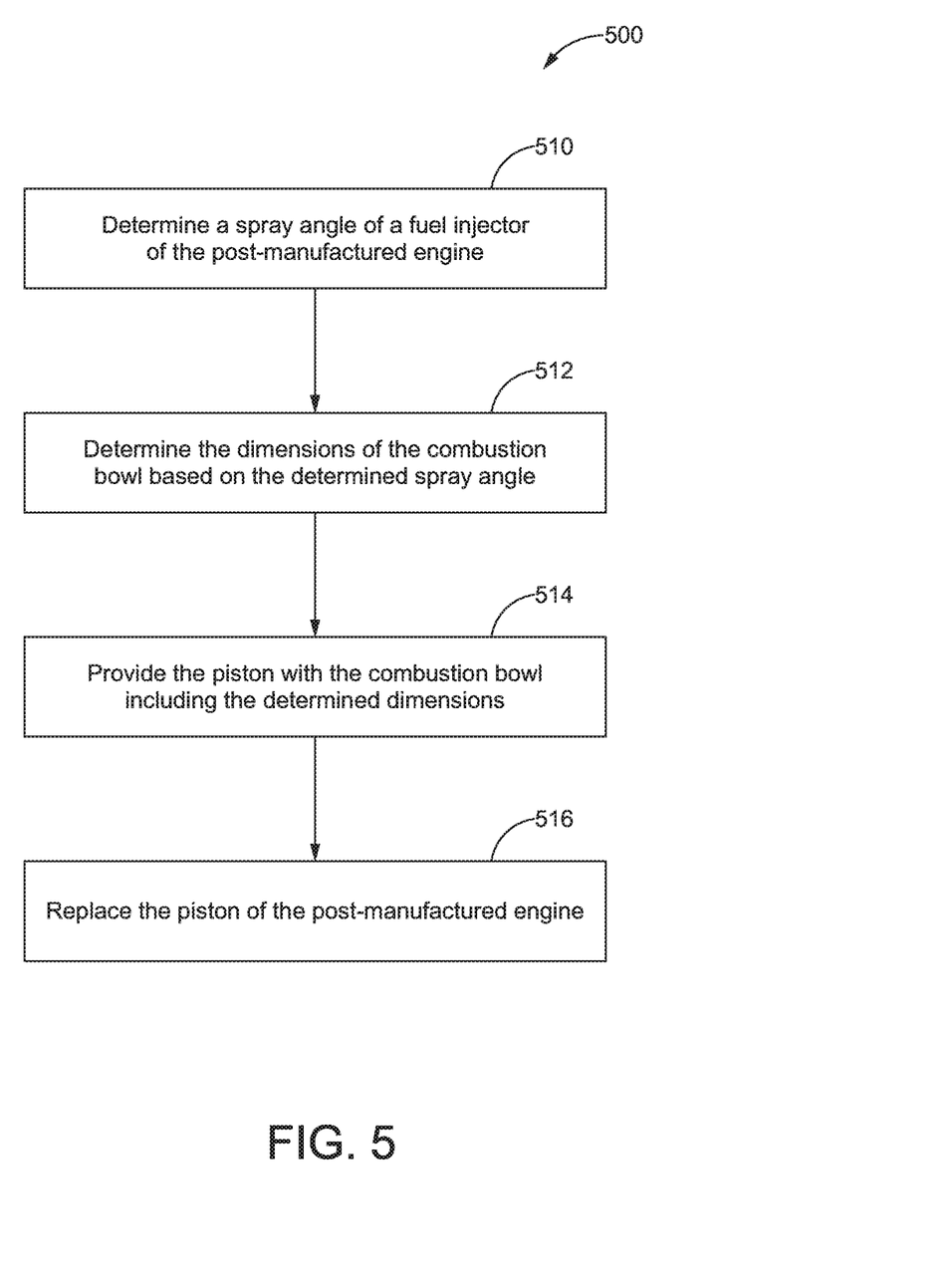
FIG. 5 is a block diagram illustrating a sample sequence of steps which may be practiced in accordance with the teachings of the present disclosure.

Moreover, in some embodiments, the combustion bowl 30 of the piston 20 may be adapted for utilization with post-manufactured engines. FIG. 5 illustrates a block diagram 500 of a sample sequence of steps which may be performed to retro-fit a post-manufactured engine with a piston including a combustion bowl. As illustrated in block 510, the spray angle of the fuel injector 34 of the post-manufactured engine is determined. With the spray angle determined, the dimensions of the combustion bowl 30 is determined based on the spray angle, as illustrated in block 512. As illustrated in block 514, the combustion bowl 30 is provided in the piston 20 to include: a central bowl apex 52 protruding axially from the combustion bowl 30 and including a central bowl apex depth 58, a first bowl apex 54 protruding axially from the combustion bowl 30 and including a first bowl apex radius 64 and a first bowl apex depth 60 that is greater than the central bowl apex depth 58; and a second bowl apex 56 protruding axially from the combustion bowl 30 and including a second bowl apex radius 66 less than the first bowl apex radius 64 and including a second bowl apex depth 62 greater than the first bowl apex depth 60. As illustrated in block 516, the piston of the post-manufactured engine is replaced with the piston 20 including the combustion bowl 30.

What is claimed is:
1. A piston for an engine, the piston comprising:
   a piston body including a piston crown, the piston crown disposed symmetrically about a central longitudinal axis of the piston;
   a combustion bowl recessed into the piston body and offset axially inwardly with respect to the piston crown, the combustion bowl disposed symmetrically about the central longitudinal axis;

a central bowl apex protruding axially from the combustion bowl, the central bowl apex disposed symmetrically about the central longitudinal axis and offset axially inwardly with respect to the piston crown;
a first bowl apex protruding axially from the combustion bowl and disposed symmetrically about the central longitudinal axis, the first bowl apex disposed radially inwardly with respect to the piston crown; and
a second bowl apex protruding axially from the combustion bowl and disposed symmetrically about the central longitudinal axis, the second bowl apex disposed radially inwardly with respect to the first bowl apex and radially between the first bowl apex and the central bowl apex, the second bowl apex offset axially inwardly with respect to the central bowl apex,
wherein the first bowl apex includes a first bowl apex radius of curvature in the range of 0 mm to 4 mm, the second bowl apex includes a second bowl apex radius of curvature in the range of 0 mm to 4 mm, the central bowl apex includes a central apex radius of curvature in the range of 0 mm to 20 mm and a central apex angle in the range of 100° to 140°, and a depth of the central bowl apex is in the range of 4 mm to 6 mm.

2. The piston of claim 1, wherein the first bowl apex is offset axially inwardly with respect to the central bowl apex and the second bowl apex is offset axially inwardly with respect to the first bowl apex.

3. The piston of claim 2, wherein the piston crown includes an inner lip offset radially outwardly with respect to the first bowl apex.

4. The piston of claim 3, further including a first depression, a second depression, and a third depression,
wherein the first depression is recessed into the piston body and transitions from the inner lip to the first bowl apex, the second depression is recessed into the piston body and transitions from the first bowl apex to the second bowl apex, and the third depression is recessed into the piston body and transitions from the second bowl apex to the central bowl apex.

5. The piston of claim 4, wherein the second depression is offset axially inwardly with respect to the first depression and the third depression is offset axially inwardly with respect to the second depression.

6. The piston of claim 5, wherein the central bowl apex includes a central apex angle in the range of 100° to 140°.

7. An engine, comprising:
an engine housing including a cylinder disposed therein;
a cylinder head coupled to the engine housing, the cylinder head including a fuel injector disposed therethrough, the fuel injector configured to inject fuel into the cylinder;
a piston operatively disposed in the cylinder, the piston including a central longitudinal axis; and
a combustion bowl recessed into the piston and disposed symmetrically about the central longitudinal axis,
the combustion bowl including a central bowl apex protruding centrally therefrom, a first bowl apex, and a second bowl apex disposed radially between the central bowl apex and the first bowl apex,
wherein the second bowl apex is offset axially inwardly with respect to the central bowl apex,
wherein the first bowl apex includes a first bowl apex radius of curvature in the range of 0 mm to 4 mm, the second bowl apex includes a second bowl apex radius of curvature in the range of 0 mm to 4 mm, the central bowl apex includes a central apex radius of curvature in the range of 0 mm to 20 mm and a central apex angle in the range of 100° to 140°, and a depth of the central bowl apex is in the range of 4 mm to 6 mm.

8. The engine of claim 7, wherein the first bowl apex is offset axially inwardly with respect to the central bowl apex and the second bowl apex is offset axially inwardly with respect to the first bowl apex.

9. The engine of claim 8, wherein the piston further includes a piston crown including an inner lip offset radially outwardly with respect to the first bowl apex.

10. The engine of claim 9, further including a first depression, a second depression, and a third depression,
wherein the first depression is recessed into the piston and transitions from the inner lip to the first bowl apex, the second depression is recessed into the piston and transitions from the first bowl apex to the second bowl apex, and the third depression is recessed into the piston and transitions from the second bowl apex to the central bowl apex.

11. The engine of claim 10, wherein the second depression is offset axially inwardly with respect to the first depression and the third depression is offset axially inwardly with respect to the second depression.

12. The engine of claim 11, wherein the central bowl apex includes a central apex angle in the range of 100° to 140°.

13. A piston for an engine, the piston comprising:
a piston body including a piston crown, the piston crown disposed symmetrically about a central longitudinal axis of the piston;
a combustion bowl recessed into the piston body and offset axially inwardly with respect to the piston crown, the combustion bowl disposed symmetrically about the central longitudinal axis;
a central bowl apex protruding axially from the combustion bowl, the central bowl apex disposed symmetrically about the central longitudinal axis and offset axially inwardly with respect to the piston crown, the central bowl apex including a central bowl apex depth;
a first bowl apex protruding axially from the combustion bowl and disposed symmetrically about the central longitudinal axis, the first bowl apex including a first bowl apex radius, the first bowl apex including a first bowl apex depth greater than the central bowl apex depth;
a second bowl apex protruding axially from the combustion bowl and disposed symmetrically about the central longitudinal axis, the second bowl apex including a second bowl apex radius less than the first bowl apex radius, the second bowl apex including a second bowl apex depth greater than the first bowl apex depth,
wherein the first bowl apex includes a first bowl apex radius of curvature in the range of 0 mm to 4 mm, the second bowl apex includes a second bowl apex radius of curvature in the range of 0 mm to 4 mm, the central bowl apex includes a central apex radius of curvature in the range of 0 mm to 20 mm and a central apex angle in the range of 100° to 140°, and the central bowl apex depth is in the range of 4 mm to 6 mm.

14. The piston of claim 13, further including a first depression, a second depression, and a third depression,
wherein the first depression is recessed into the piston body and transitions from the piston crown to the first bowl apex, the second depression is recessed into the piston body and transitions from the first bowl apex to the second bowl apex, and the third depression is recessed into the piston body and transitions from the second bowl apex to the central bowl apex.

15. The piston of claim 14, wherein the first depression includes a first depression depth, the second depression includes a second depression depth, and the third depression includes a third depression depth, the first depression depth is less than the second depression depth and the second depression depth is less than the third depression depth.

16. The piston of claim 15, wherein the first depression depth is in the range of 8 mm to 9 mm, the second depression depth is in the range of 16 mm to 20 mm, and the third depression depth is in the range of 19 mm to 21 mm.

17. The piston of claim 16, wherein the first depression includes a first depression radius of curvature in the range of 9 mm to 11 mm, the second depression includes a second depression radius of curvature in the range of 15 mm to 17 mm, and the third depression includes a third depression radius of curvature in the range of 15 mm to 17 mm.

18. The piston of claim 13, wherein the piston crown further includes an inner lip including an inner lip radius of curvature in the range of 0 mm to 4 mm.

19. The piston of claim 18, further including a first depression, a second depression, and a third depression, the first depression is recessed into the piston body and transitions from the inner lip to the first bowl apex, the second depression is recessed into the piston body and transitions from the first bowl apex to the second bowl apex, and the third depression is recessed into the piston body and transitions from the second bowl apex to the central bowl apex.

* * * * *